(12) United States Patent
Nelogal et al.

(10) Patent No.: US 10,521,318 B2
(45) Date of Patent: Dec. 31, 2019

(54) SPANNED RAID WITH NESTED PARITY

(71) Applicant: Dell Products L.P., Round Rock, TX (US)

(72) Inventors: Chandrashekar Nelogal, Round Rock, TX (US); Deepu Syam Sreedhar M, Calicut (IN); Sandeep Agarwal, Bangalore (IN); Amit Pratap Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 15/784,786

(22) Filed: Oct. 16, 2017

(65) Prior Publication Data
US 2019/0114238 A1    Apr. 18, 2019

(51) Int. Cl.
*G06F 11/20* (2006.01)
*G06F 3/06* (2006.01)

(52) U.S. Cl.
CPC .......... *G06F 11/2094* (2013.01); *G06F 3/065* (2013.01); *G06F 3/0619* (2013.01); *G06F 3/0665* (2013.01); *G06F 3/0689* (2013.01); *G06F 2201/805* (2013.01); *G06F 2201/82* (2013.01)

(58) Field of Classification Search
CPC ............. G06F 11/1076; G06F 11/1088; G06F 11/1096; G06F 11/108; G06F 11/1057; G06F 3/0689; G06F 3/0646; G06F 3/0681; G06F 11/2094; G06F 11/2069
See application file for complete search history.

(56) References Cited

U.S. PATENT DOCUMENTS

| | | | |
|---|---|---|---|
| 5,499,253 A | 3/1996 | Lary | |
| 6,101,615 A * | 8/2000 | Lyons | G06F 11/1076 711/114 |
| 6,976,116 B2 * | 12/2005 | Aruga | G06F 3/0613 710/316 |
| 7,103,716 B1 * | 9/2006 | Nanda | G06F 11/1076 711/114 |
| 8,037,391 B1 | 10/2011 | Jung et al. | |
| 8,335,966 B1 | 12/2012 | Lary et al. | |
| 9,535,619 B2 | 1/2017 | Joshi et al. | |
| 9,652,175 B2 * | 5/2017 | Vanaraj | G06F 11/1076 |
| 9,772,796 B2 * | 9/2017 | Vanaraj | G06F 11/1076 |
| 2016/0299724 A1 * | 10/2016 | Vanaraj | G06F 11/1076 |
| 2017/0168896 A1 * | 6/2017 | Karrotu | G06F 11/1076 |

* cited by examiner

*Primary Examiner* — Nadeem Iqbal
(74) *Attorney, Agent, or Firm* — Jackson Walker L.L.P.

(57) ABSTRACT

In accordance with embodiments of the present disclosure, a method may be implemented to respond to receiving data A to be stored in a storage system that includes a plurality of N spans, each including a plurality of M drives. The method may include performing data storing operations. The data storing operations may include storing the data A in N portions across the plurality of spans, generating a Za parity based on an XOR operation applied to the N portions of the data A, storing the Za parity in N−1 portions across a subset of the plurality of spans, determining a Zap parity based on an XOR operation applied to the N−1 portions of the Za parity, and storing the Zap parity.

20 Claims, 6 Drawing Sheets

SPANNED RAID WITH NESTED PARITY

TECHNICAL FIELD

The present disclosure relates generally to data storage systems and methods, and more particularly to systems and methods for storing parity information usable to re-generate data in the event of hardware failure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

RAID, an acronym for Redundant Array of Independent Disks, includes data storage schemes that can divide and replicate data among multiple physical disk drives. The physical disks are said to be in a RAID array, which is addressed by the operating system as one single disk (also referred to as a virtual disk). Many different schemes or architectures of RAID devices are known to those having ordinary skill in the art, some of which rely on parity information to provide redundancy and fault tolerance. Each different architecture or scheme may provide a different balance among various goals to be achieved in storing data, which include, but are not limited to, increased data reliability and increased input/output (hereinafter "I/O") performance.

In this regard, RAID is a technology that provides increased storage functions and increased reliability through redundancy, and as such may be beneficially employed in information handling systems. Redundancy in a RAID device may be achieved by combining multiple disk drive components, which may include one or more disks of different type, size, or classification, into a logical unit, where data is distributed across the drives in one of several ways called "RAID levels." The data distribution determines the RAID type, e.g., RAID 0, RAID 1, RAID 5, RAID 6, RAID 10, RAID 60, etc.

In its simplest form, parity-based RAID works by writing stripes of data across three or more physical storage resources. For example, a data strip may be written to W−1 of the physical storage resources of the RAID array and a parity strip written to one of the physical storage resources of the RAID array, where "W" equals the number of devices in the RAID array. In RAID 5, for example, each written parity strip may be written as the logical exclusive OR (XOR) of the data strips within the same stripe as the parity strip. Accordingly, if a physical storage resource of a RAID array fails, the data and/or parity stored on the failed storage resource can be rebuilt by performing an XOR operation on the remaining storage resources.

RAID 60, also called RAID 6+0, combines the block-level striping of RAID 0 with the distributed double parity of RAID 6, resulting in a RAID 0 array striped across RAID 6 spans. Each span is RAID 6 and consists of at least 4 or more hard drives. When data is to be written, it is striped and distributed among the spans. Since each span is RAID 6, two types of parity data are calculated for each stripe of data written to the drives, referred to respectively as P and Q parity. RAID 60 may typically be costly in terms of processing time, mainly because Q parity generation requires Galois field arithmetic to be performed. In some instances, specialized hardware may be used to execute these processes more efficiently.

The use of the teachings of this disclosure may mitigate or eliminate various challenges and drawbacks associated with existing solutions. For example, the use of the present disclosure may reduce the amount of processing power required to generate parity data while maintaining or even increasing the level of data redundancy.

SUMMARY

In accordance with the teachings of the present disclosure, the disadvantages and problems associated with existing approaches to data storage may be substantially reduced or eliminated.

In accordance with embodiments of the present disclosure, a method may include in response to receiving data A to be stored in a storage system that includes a plurality of N spans each including a plurality of M drives, performing data storing operations. The data storing operations may include storing the data A in N portions across the plurality of spans, generating a Za parity based on an XOR operation applied to the N portions of the data A, storing the Za parity in N−1 portions across a subset of the plurality of spans, determining a Zap parity based on an XOR operation applied to the N−1 portions of the Za parity, and storing the Zap parity.

In these and other embodiments, an article of manufacture may include a non-transitory, computer-readable medium having instructions stored thereon that are configured to be executed by a computer system having a storage system that includes a plurality of N spans each including a plurality of M drives. The instructions may be for performing data storing operations in response to receiving data A to be stored in the storage system. The data storing operations may include storing the data A in N portions across the plurality of spans, generating a Za parity based on an XOR operation applied to the N portions of the data A, storing the Za parity in N−1 portions across a subset of the plurality of spans, determining a Zap parity based on an XOR operation applied to the N−1 portions of the Za parity, and storing the Zap parity.

In these and other embodiments, a system may include at least one processor and a storage system that includes a plurality of N spans each including a plurality of M drives. In response to receiving data A to be stored in the storage system, the system may be configured to perform data storing operations that include storing the data A in N portions across the plurality of spans, generating a Za parity based on an XOR operation applied to the N portions of the data A, storing the Za parity in N−1 portions across a subset of the plurality of spans, determining a Zap parity based on an XOR operation applied to the N−1 portions of the Za parity, and storing the Zap parity.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
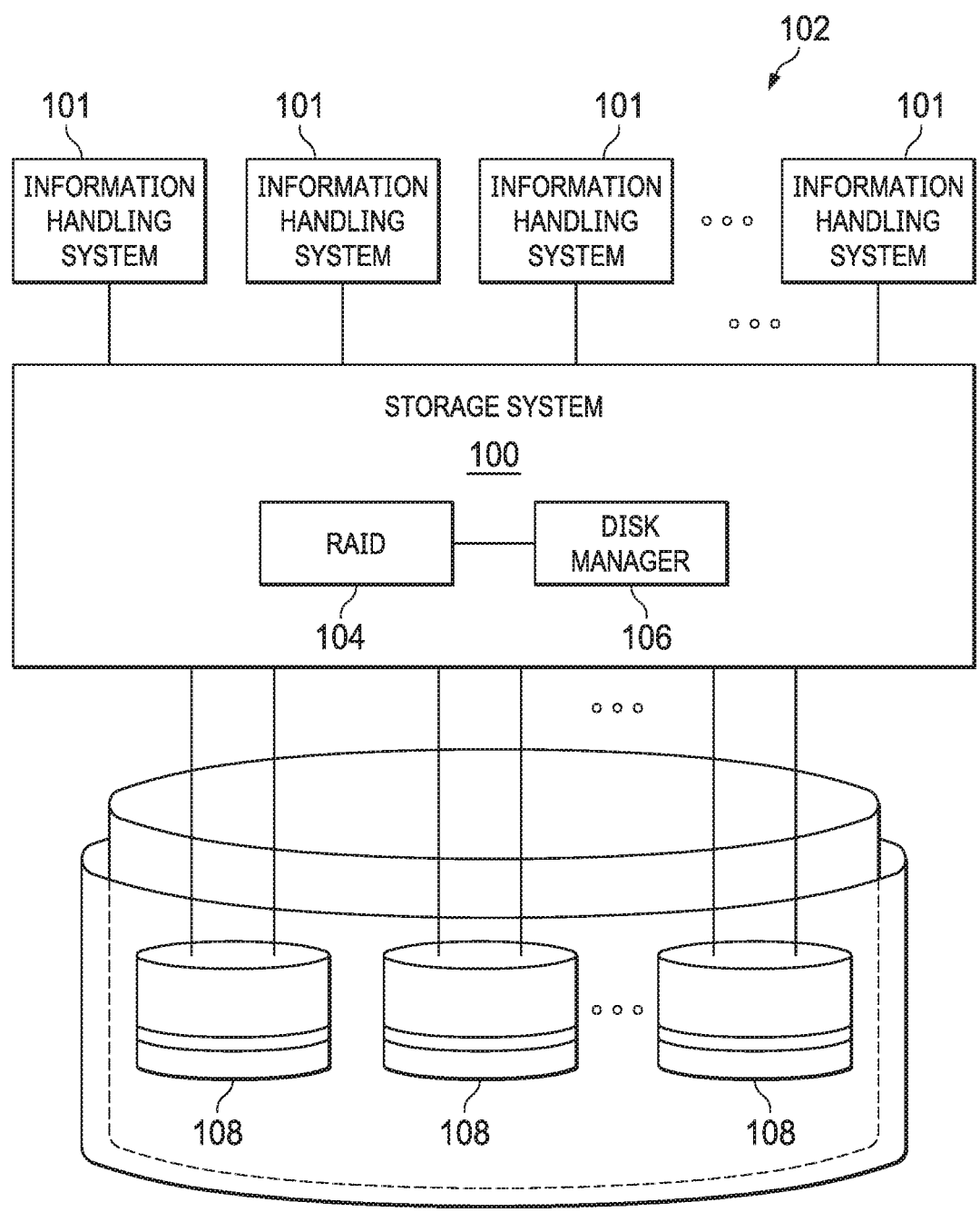
FIG. 1 illustrates a block diagram of an example storage system in an information handling system, in accordance with the embodiments of the present disclosure.

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, the terms "drive," "disk drive," and "physical storage resource" may be used interchangeably and may include any non-volatile storage devices, regardless of whether or not such devices include a physical disk. For example, these terms may include hard drives that operate via magnetic recording, solid-state drives, flash drives, optical drives, magneto-optical drives, compact disk drives, compact disk arrays, etc.

For purposes of this disclosure, the term "span" may include a plurality of drives treated as a unit. For example, in a RAID 10 implementation, individual disks may first be combined into mirrored RAID 1 sets referred to as spans. These spans may then be combined into a striped RAID 0 set.

For the purposes of this disclosure, "information handling resources" may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Turning now to FIG. 1, a block diagram is shown of an example storage system 100 in an information handling system environment 102, in accordance with embodiments of the present disclosure. As shown in FIG. 1, environment 102 may include one or more information handling systems 101 communicatively coupled to storage system 100. In some embodiments, an information handling system 101 may comprise a personal computer. In some embodiments, an information handling system 101 may comprise or be an integral part of a server. In other embodiments, an information handling system 101 may comprise a portable information handling system (e.g., a laptop, notebook, tablet, handheld, smart phone, personal digital assistant, etc.).

As shown in FIG. 1, storage system 100 may include RAID subsystem 104 and disk manager 106 having at least one disk storage system controller. Disk manager 106, as shown in FIG. 1, may generally manage disks and disk arrays, including grouping/resource pooling, abstraction of disk attributes, formatting, addition/subtraction of disks, tracking of disk service times and error rates, etc.

Disk manager 106 may also interface with devices, such as a Small Computer System Interface (SCSI) device subsystem which may be responsible for detecting the presence of external storage devices. Such a SCSI device subsystem may be capable, at least for Fibre Channel/SCSI/Serial-Attached SCSI (SAS) type devices, of determining a subset of devices which are block-type target storage devices. It is these devices which may be managed and abstracted by disk manager 106.

Furthermore, disk manager 106 may manage one or more disk storage system controllers. In some embodiments, a plurality of redundant disk storage system controllers may be implemented to cover the failure of an operating disk storage system controller. Redundant disk storage system controllers may also be managed by disk manager 106.

Disk manager 106 may interact with several other subsystems. For example, RAID subsystem 104 may be the major client of the services provided by disk manager 106 for data path activities. RAID subsystem 104 may use disk manager 106 as an exclusive path to disks 108 for I/O. RAID system 104 may also listen for events from disk manager 106 to determine the presence and operational status of disks 108. RAID subsystem 104 may also interact with disk manager 106 to allocate extents for the construction of RAID devices. In some embodiments of the present disclosure, RAID subsystem 104 may include a combination of at least one RAID type, such as RAID 0, RAID 1, RAID 5, RAID 6, RAID 10, RAID 50, and RAID 60. It will be appreciated that other RAID types can be used in alternative RAID subsystems, such as RAID 3, RAID 4, etc.

Disk manager 106 may also utilize services of the SCSI device layer to learn of the existence and operational status of block devices, and may have an I/O path to these block devices. Disk manager 106 may query the SCSI device subsystem about devices as a supporting method to uniquely identify disks. Information handling systems 101, RAID subsystem 104, and disk manager 106 may include various processors, memories, and other information handling resources as appropriate (not shown separately).

For example, a processor included in one of such elements may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or to process data. In some embodiments, a processor may interpret and/or execute program instructions and/or process data stored in RAID subsystem 104, another component of storage system 100, and/or another component of environment 102. A memory may be communicatively coupled to such a processor and may include any system, device, or apparatus configured to retain program instructions and/or data for a period of time (e.g., computer-readable media). Such memory may include RAM, EEPROM, a PCMCIA card, flash memory, magnetic storage, opto-magnetic storage, or any suitable selection and/or array of volatile or non-volatile memory that may retain data after power is turned off.

Figure 2:
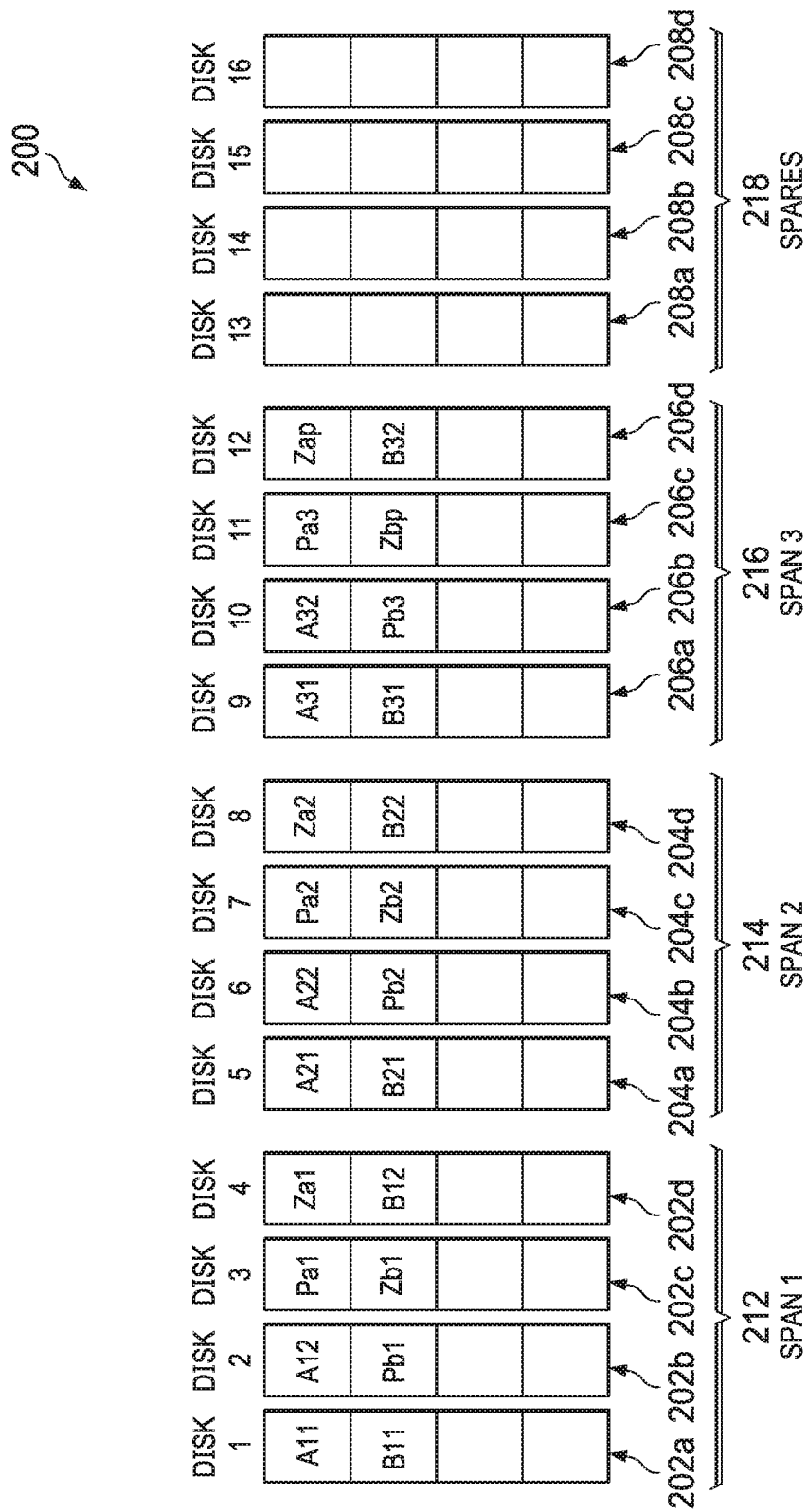
FIG. 2 illustrates a block diagram of an example storage solution, in accordance with the embodiments of the present disclosure.

Turning now to FIG. 2, an embodiment of system 200 is shown in which three spans are present, each including four disks. As shown, disk 1 202a, disk 2 202b, disk 3 202c, and disk 4 202d belong to span 1 212. Similarly, disks 204a-d belong to span 2 214, and disks 206a-d belong to span 3 316. Four hot spare drives 208a-d are shown at 218.

When a write operation is requested for a piece of data "A," the data may be striped such that each block of data is sent to each span of the RAID group. As shown, data A is striped to A1, A2, and A3. This may include striping the data in each span to the drives within each span: for example, data A1 in span 1 212 may be broken down into A11 and A12; data A2 in span 2 214 may be broken down into A21 and A22; and data A3 in span 3 216 may be broken down into A31 and A32.

Further, P parity (as used in RAID 5 or RAID 6) may be generated within each span. For example, within span 1 212, P parity data "Pa1" may be generated for data A1 by XOR'ing A11 with A12. That is, Pa1=A11 XOR A12. This may further be carried out similarly in the other spans to generate Pa2 and Pa3.

Additional parity data "Z" for data A may be calculated by XOR'ing A1, A2 and A3. That is, "Za"=A1 XOR A2 XOR A3. The Za parity may be further broken down into strips of equal size (e.g., the same size of data strips within each span). That is, Za=Za1 concatenated with Za2. Further, parity data "Zap" may be generated by XOR'ing Za1 with Za2 (Zap=Za1 XOR Za2). This Z parity data may be uniformly distributed across drives in each span, as shown.

In some embodiments, the Za parity calculation may be performed in parallel with the P parity calculation. In some embodiments, the maximum number of disks in a span and the maximum number of spans in a virtual disk may be the same as in standard RAID 60.

Further, in some embodiments, the Zp parity calculation may be scheduled in such a way that the calculation occurs while the Za1 and Za2 are still in DRAM or a processor cache to further improve performance.

FIG. 2 also illustrates similarly the writing of data B, with corresponding Pb and Zb parity.

This embodiment may be implemented for virtual disks containing an even or an odd number of drives in a span, as well as for even or odd numbers of spans in a virtual disk. In some embodiments, the number of spans and the number of disks may be subject to the following constraint: number of spans>=(number of data drives in a span+1).

As illustrated in FIG. 2, the steps for writing a data block A may be summarized as follows:

Data A is striped as A1, A2 and A3
Za=A1 XOR A2 XOR A3
Za is broken down as Za1 and Za2
Zap=Za1 XOR Za2
Data A1 is sent to span 1 212 and striped further to obtain A11 and A12. A11 is written in disk 1, and A12 is written in disk 2. The parity Pa1 is calculated by performing A11 XOR A12 and stored in disk 3. A strip of Z parity Za1 is written to disk 4.
Similarly, data A2 is sent to span 2 214 and striped further to obtain A21 and A22. A21 is written in disk 5, and A22 is written in disk 6. The parity Pa2 is calculated by performing A21 XOR A22 and stored in disk 7. A strip of Z parity Za2 is written to disk 8.
Similarly, data A3 is sent to span 3 216 and striped further to obtain A31 and A32. A31 is written in disk 9, and A32 is written in disk 10. The parity Pa3 is calculated by performing A31 XOR A32 and stored in disk 11.
Parity Zap is written to disk 12.

FIG. 2 thus illustrates the case of three spans and four drives per span (that is, two data drives and two parity drives per span, although in practice, parity information may be distributed among the drives within a span instead of being placed on a dedicated parity drive). Table 1 below summarizes the embodiment of FIG. 2, but with three elements of data A, B, and C. Tables 2-8 provide additional example embodiments with different numbers of spans and drives. In some embodiments shown in the Tables, a certain amount of space is left over, denoted with empty entries. One of ordinary skill in the art with the benefit of this disclosure will understand that the Tables use zero-indexed numbering for the spans and disks, whereas elsewhere in the disclosure one-indexed numbering may be used. Further, hot spare drives are not shown for the sake of brevity in the Tables.

TABLE 1

Three spans, with two data drives per span.

| Span0 | | | |
|---|---|---|---|
| Disk0 | Disk1 | Disk2 | Disk3 |
| A11 | A12 | Pa1 | Za1 |
| B11 | Pb1 | Zb1 | B12 |
| Pc1 | Zc1 | C11 | C12 |

TABLE 1-continued

Three spans, with two data drives per span.

Span1

| Disk4 | Disk5 | Disk6 | Disk7 |
|---|---|---|---|
| A21 | A22 | Pa2 | Za2 |
| B21 | Pb2 | Zb2 | B22 |
| Pc2 | Zc2 | C21 | C22 |

Span2

| Disk8 | Disk9 | Disk10 | Disk11 |
|---|---|---|---|
| A31 | A32 | Pa3 | Zap |
| B31 | Pb3 | Zbp | B32 |
| Pc3 | Zcp | C31 | C32 |

| Size of Zx | Size of Zxp | Additional Strips necessary | Space left over |
|---|---|---|---|
| 2 Strips | 1 Strip | 3 | 0 |
| 2 Strips | 1 Strip | 3 | 0 |
| 2 Strips | 1 Strip | 3 | 0 |

TABLE 2

Four spans, with two data drives per span.

Span0

| Disk0 | Disk1 | Disk2 | Disk3 |
|---|---|---|---|
| A11 | A12 | Pa1 | Za1 |
| B11 | Pb1 | Zb1 | B12 |
| Pc1 | Zc1 | C11 | C12 |

Span1

| Disk4 | Disk5 | Disk6 | Disk7 |
|---|---|---|---|
| A21 | A22 | Pa2 | Za2 |
| B21 | Pb2 | Zb2 | B22 |
| Pc2 | Zc2 | C21 | C22 |

Span2

| Disk8 | Disk9 | Disk10 | Disk11 |
|---|---|---|---|
| A31 | A32 | Pa3 | Zap |
| B31 | Pb3 | Zbp | B32 |
| Pc3 | Zcp | C31 | C32 |

Span3

| Disk12 | Disk13 | Disk14 | Disk15 |
|---|---|---|---|
| A41 | A42 | Pa4 |  |
| B41 | Pb4 |  | B42 |
| Pc4 |  | C41 | C42 |

| Size of Zx | Size of Zxp | Additional Strips necessary | Space left over |
|---|---|---|---|
| 2 Strips | 1 Strip | 3 | 1 |
| 2 Strips | 1 Strip | 3 | 1 |
| 2 Strips | 1 Strip | 3 | 1 |

TABLE 3

Five spans, with four data drives per span.

Span0

| Disk0 | Disk1 | Disk2 | Disk3 | Disk4 | Disk5 |
|---|---|---|---|---|---|
| A11 | A12 | A13 | A14 | Pa1 | Za1 |
| B11 | B12 | B13 | Pb1 | Zb1 | B14 |
| C11 | C12 | Pc1 | Zc1 | C13 | C14 |

Span1

| Disk6 | Disk7 | Disk8 | Disk9 | Disk10 | Disk11 |
|---|---|---|---|---|---|
| A21 | A22 | A23 | A24 | Pa2 | Za2 |
| B21 | B22 | B23 | Pb2 | Zb2 | B24 |
| C21 | C22 | Pc2 | Zc2 | C23 | C24 |

Span2

| Disk12 | Disk13 | Disk14 | Disk15 | Disk16 | Disk17 |
|---|---|---|---|---|---|
| A31 | A32 | A33 | A34 | Pa3 | Za3 |
| B31 | B32 | B33 | Pb3 | Zb3 | B34 |
| C31 | C32 | Pc3 | Zc3 | C33 | C34 |

Span3

| Disk18 | Disk19 | Disk20 | Disk21 | Disk22 | Disk23 |
|---|---|---|---|---|---|
| A41 | A42 | A43 | A44 | Pa4 | Za4 |
| B41 | B42 | B43 | Pb4 | Zb4 | B44 |
| C41 | C42 | Pc4 | Zc4 | C43 | C44 |

Span4

| Disk24 | Disk25 | Disk26 | Disk27 | Disk28 | Disk29 |
|---|---|---|---|---|---|
| A51 | A52 | A53 | A54 | Pa5 | Zap |
| B51 | B52 | B53 | Pb5 | Zbp | B54 |
| C51 | C52 | Pc5 | Zcp | C53 | C54 |

| Size of Zx | Size of Zxp | Additional Strips necessary | Space left over |
|---|---|---|---|
| 4 Strips | 1 Strip | 5 | 0 |
| 4 Strips | 1 Strip | 5 | 0 |
| 4 Strips | 1 Strip | 5 | 0 |

TABLE 4

Six spans, with four data drives per span.

Span0

| Disk0 | Disk1 | Disk2 | Disk3 | Disk4 | Disk5 |
|---|---|---|---|---|---|
| A11 | A12 | A13 | A14 | Pa1 | Za1 |
| B11 | B12 | B13 | Pb1 | Zb1 | B14 |
| C11 | C12 | Pc1 | Zc1 | C13 | C14 |

Span1

| Disk6 | Disk7 | Disk8 | Disk9 | Disk10 | Disk11 |
|---|---|---|---|---|---|
| A21 | A22 | A23 | A24 | Pa2 | Za2 |
| B21 | B22 | B23 | Pb2 | Zb2 | B24 |
| C21 | C22 | Pc2 | Zc2 | C23 | C24 |

Span2

| Disk12 | Disk13 | Disk14 | Disk15 | Disk16 | Disk17 |
|---|---|---|---|---|---|
| A31 | A32 | A33 | A34 | Pa3 | Za3 |
| B31 | B32 | B33 | Pb3 | Zb3 | B34 |
| C31 | C32 | Pc3 | Zc3 | C33 | C34 |

TABLE 4-continued

Six spans, with four data drives per span.

Span3

| Disk18 | Disk19 | Disk20 | Disk21 | Disk22 | Disk23 |
|---|---|---|---|---|---|
| A41 | A42 | A43 | A44 | Pa4 | Za4 |
| B41 | B42 | B43 | Pb4 | Zb4 | B44 |
| C41 | C42 | Pc4 | Zc4 | C43 | C44 |

Span4

| Disk24 | Disk25 | Disk26 | Disk27 | Disk28 | Disk29 |
|---|---|---|---|---|---|
| A51 | A52 | A53 | A54 | Pa5 | Zap |
| B51 | B52 | B53 | Pb5 | Zbp | B54 |
| C51 | C52 | Pc5 | Zcp | C53 | C54 |

Span5

| Disk30 | Disk31 | Disk32 | Disk33 | Disk34 | Disk35 |
|---|---|---|---|---|---|
| A61 | A62 | A63 | A64 | Pa6 | |
| B61 | B62 | B63 | Pb6 | | B54 |
| C61 | C62 | Pc6 | | C63 | C64 |

| Size of Zx | Size of Zxp | Additional Strips necessary | Space left over |
|---|---|---|---|
| 4 Strips | 1 Strip | 5 | 1 |
| 4 Strips | 1 Strip | 5 | 1 |
| 4 Strips | 1 Strip | 5 | 1 |

TABLE 5

Four spans, with three data drives per span.

Span0

| Disk0 | Disk1 | Disk2 | Disk3 | Disk4 |
|---|---|---|---|---|
| A11 | A12 | A13 | Pa1 | Za1 |
| B11 | B12 | Pb1 | Zb1 | B13 |
| C11 | Pc1 | Zc1 | C12 | C13 |

Span1

| Disk5 | Disk6 | Disk7 | Disk8 | Disk9 |
|---|---|---|---|---|
| A21 | A22 | A23 | Pa2 | Za2 |
| B21 | B22 | Pb2 | Zb2 | B23 |
| C21 | Pc2 | Zc2 | C22 | C23 |

Span2

| Disk10 | Disk11 | Disk12 | Disk13 | Disk14 |
|---|---|---|---|---|
| A31 | A32 | A33 | Pa3 | Za3 |
| B31 | B32 | Pb3 | Zb3 | B33 |
| C31 | Pc3 | Zc3 | C32 | C33 |

Span3

| Disk15 | Disk16 | Disk17 | Disk18 | Disk19 |
|---|---|---|---|---|
| A41 | A42 | A43 | Pa4 | Zap |
| B41 | B42 | Pb4 | Zbp | B43 |
| C41 | Pc4 | Zcp | C42 | C43 |

| Size of Zx | Size of Zxp | Additional Strips necessary | Space left over |
|---|---|---|---|
| 3 Strips | 1 Strip | 4 | 0 |
| 3 Strips | 1 Strip | 4 | 0 |
| 3 Strips | 1 Strip | 4 | 0 |

TABLE 6

Five spans, with three data drives per span.

Span0

| Disk0 | Disk1 | Disk2 | Disk3 | Disk4 |
|---|---|---|---|---|
| A11 | A12 | A13 | Pa1 | Za1 |
| B11 | B12 | Pb1 | Zb1 | B13 |
| C11 | Pc1 | Zc1 | C12 | C13 |

Span1

| Disk5 | Disk6 | Disk7 | Disk8 | Disk9 |
|---|---|---|---|---|
| A21 | A22 | A23 | Pa2 | Za2 |
| B21 | B22 | Pb2 | Zb2 | B23 |
| C21 | Pc2 | Zc2 | C22 | C23 |

Span2

| Disk10 | Disk11 | Disk12 | Disk13 | Disk14 |
|---|---|---|---|---|
| A31 | A32 | A33 | Pa3 | Za3 |
| B31 | B32 | Pb3 | Zb3 | B33 |
| C31 | Pc3 | Zc3 | C32 | C33 |

Span3

| Disk15 | Disk16 | Disk17 | Disk18 | Disk19 |
|---|---|---|---|---|
| A41 | A42 | A43 | Pa4 | Zap |
| B41 | B42 | Pb4 | Zbp | B43 |
| C41 | Pc4 | Zcp | C42 | C43 |

Span4

| Disk20 | Disk21 | Disk22 | Disk23 | Disk24 |
|---|---|---|---|---|
| A51 | A52 | A53 | Pa5 | |
| B51 | B52 | Pb5 | | B53 |
| C51 | Pc5 | | C52 | C53 |

| Size of Zx | Size of Zxp | Additional Strips necessary | Space left over |
|---|---|---|---|
| 3 Strips | 1 Strip | 4 | 1 |
| 3 Strips | 1 Strip | 4 | 1 |
| 3 Strips | 1 Strip | 4 | 1 |

TABLE 7

Six Spans, with five data drives per Span.

Span0

| Disk0 | Disk1 | Disk2 | Disk3 | Disk4 | Disk5 | Disk6 |
|---|---|---|---|---|---|---|
| A11 | A12 | A13 | A14 | A15 | Pa1 | Za1 |
| B11 | B12 | B13 | B14 | Pb1 | Zb1 | B15 |
| C11 | C12 | C13 | Pc1 | Zc1 | C14 | C15 |

Span1

| Disk7 | Disk8 | Disks9 | Disk10 | Disk11 | Disk12 | Disk13 |
|---|---|---|---|---|---|---|
| A21 | A22 | A23 | A24 | A25 | Pa2 | Za2 |
| B21 | B22 | B23 | B24 | Pb2 | Zb2 | B25 |
| C21 | C22 | C23 | Pc2 | Zc2 | C24 | C25 |

Span2

| Disk14 | Disk15 | Disk16 | Disk17 | Disk18 | Disk19 | Disk20 |
|---|---|---|---|---|---|---|
| A31 | A32 | A33 | A34 | A35 | Pa3 | Za3 |
| B31 | B32 | B33 | B34 | Pb3 | Zb3 | B35 |
| C31 | C32 | C33 | Pc3 | Zc3 | C34 | C35 |

TABLE 7-continued

Six Spans, with five data drives per Span.

Span3

| Disk21 | Disk22 | Disk23 | Disk24 | Disk25 | Disk26 | Disk27 |
|---|---|---|---|---|---|---|
| A41 | A42 | A43 | A44 | A45 | Pa4 | Za4 |
| B41 | B42 | B43 | B44 | Pb4 | Zb4 | B45 |
| C41 | C42 | C43 | Pc4 | Zc4 | C44 | C45 |

Span4

| Disk28 | Disk29 | Disk30 | Disk31 | Disk32 | Disk33 | Disk34 |
|---|---|---|---|---|---|---|
| A51 | A52 | A53 | A54 | A55 | Pa5 | Za5 |
| B51 | B52 | B53 | B54 | Pb5 | Zb5 | B43 |
| C51 | C52 | C53 | Pc5 | Zc5 | C54 | C55 |

Span5

| Disk35 | Disk36 | Disk37 | Disk38 | Disk39 | Disk40 | Disk41 |
|---|---|---|---|---|---|---|
| A61 | A62 | A63 | A64 | A65 | Pa6 | Zap |
| B61 | B62 | B63 | B64 | Pb6 | Zbp | B65 |
| C61 | C62 | C63 | Pc6 | Zcp | C64 | C65 |

| Size of Zx | Size of Zxp | Additional Strips necessary | Space left over |
|---|---|---|---|
| 5 Strips | 1 Strip | 6 | 0 |
| 5 Strips | 1 Strip | 6 | 0 |
| 5 Strips | 1 Strip | 6 | 0 |

TABLE 8

Seven Spans, with five data drives per Span.

Span0

| Disk0 | Disk1 | Disk2 | Disk3 | Disk4 | Disk5 | Disk6 |
|---|---|---|---|---|---|---|
| A11 | A12 | A13 | A14 | A15 | Pa1 | Za1 |
| B11 | B12 | B13 | B14 | Pb1 | Zb1 | B15 |
| C11 | C12 | C13 | Pc1 | Zc1 | C14 | C15 |

Span1

| Disk7 | Disk8 | Disks9 | Disk10 | Disk11 | Disk12 | Disk13 |
|---|---|---|---|---|---|---|
| A21 | A22 | A23 | A24 | A25 | Pa2 | Za2 |
| B21 | B22 | B23 | B24 | Pb2 | Zb2 | B25 |
| C21 | C22 | C23 | Pc2 | Zc2 | C24 | C25 |

Span2

| Disk14 | Disk15 | Disk16 | Disk17 | Disk18 | Disk19 | Disk20 |
|---|---|---|---|---|---|---|
| A31 | A32 | A33 | A34 | A35 | Pa3 | Za3 |
| B31 | B32 | B33 | B34 | Pb3 | Zb3 | B35 |
| C31 | C32 | C33 | Pc3 | Zc3 | C34 | C35 |

Span3

| Disk21 | Disk22 | Disk23 | Disk24 | Disk25 | Disk26 | Disk27 |
|---|---|---|---|---|---|---|
| A41 | A42 | A43 | A44 | A45 | Pa4 | Za4 |
| B41 | B42 | B43 | B44 | Pb4 | Zb4 | B45 |
| C41 | C42 | C43 | Pc4 | Zc4 | C44 | C45 |

Span4

| Disk28 | Disk29 | Disk30 | Disk31 | Disk32 | Disk33 | Disk34 |
|---|---|---|---|---|---|---|
| A51 | A52 | A53 | A54 | A55 | Pa5 | Za5 |
| B51 | B52 | B53 | B54 | Pb5 | Zb5 | B43 |
| C51 | C52 | C53 | Pc5 | Zc5 | C54 | C55 |

TABLE 8-continued

Seven Spans, with five data drives per Span.

Span5

| Disk35 | Disk36 | Disk37 | Disk38 | Disk39 | Disk40 | Disk41 |
|---|---|---|---|---|---|---|
| A61 | A62 | A63 | A64 | A65 | Pa6 | Zap |
| B61 | B62 | B63 | B64 | Pb6 | Zbp | B65 |
| C61 | C62 | C63 | Pc6 | Zcp | C64 | C65 |

Span6

| Disk42 | Disk43 | Disk44 | Disk45 | Disk46 | Disk47 | Disk48 |
|---|---|---|---|---|---|---|
| A71 | A72 | A73 | A74 | A75 | Pa7 | |
| B71 | B72 | B73 | B74 | Pb7 | | B75 |
| C71 | C72 | C73 | Pc7 | | C74 | C75 |

| Size of Zx | Size of Zxp | Additional Strips necessary | Space left over |
|---|---|---|---|
| 5 Strips | 1 Strip | 6 | 1 |
| 5 Strips | 1 Strip | 6 | 1 |
| 5 Strips | 1 Strip | 6 | 1 |

As can be seen from the above Tables, this disclosure is quite flexible in terms of the allowable number of spans and drives per span. One of ordinary skill in the art with the context of this disclosure will recognize additional possibilities that are not explicitly shown.

This disclosure may be particularly useful in large deployments with many drives. Further, to achieve additional performance improvements, the Z parity may be calculated later or may be coalesced into a smaller number of operations (e.g., by waiting for multiple data updates and calculating them infrequently) than partial stripe P parity calculations.

For any subsequent modifications to the data, the respective Z parity may be re-calculated and striped along with the corresponding Zp parity.

In some instances, one or more of disks 108 may encounter a failure. For example, a disk might encounter a hardware or software error, become accidentally disconnected from a cable, or become partially or wholly inoperable in some other way. Depending on the specifics of environment 102 and the nature of the failure(s), different types of data recovery operations may be appropriate. The following FIGURES provide several example embodiments.

Figure 3:
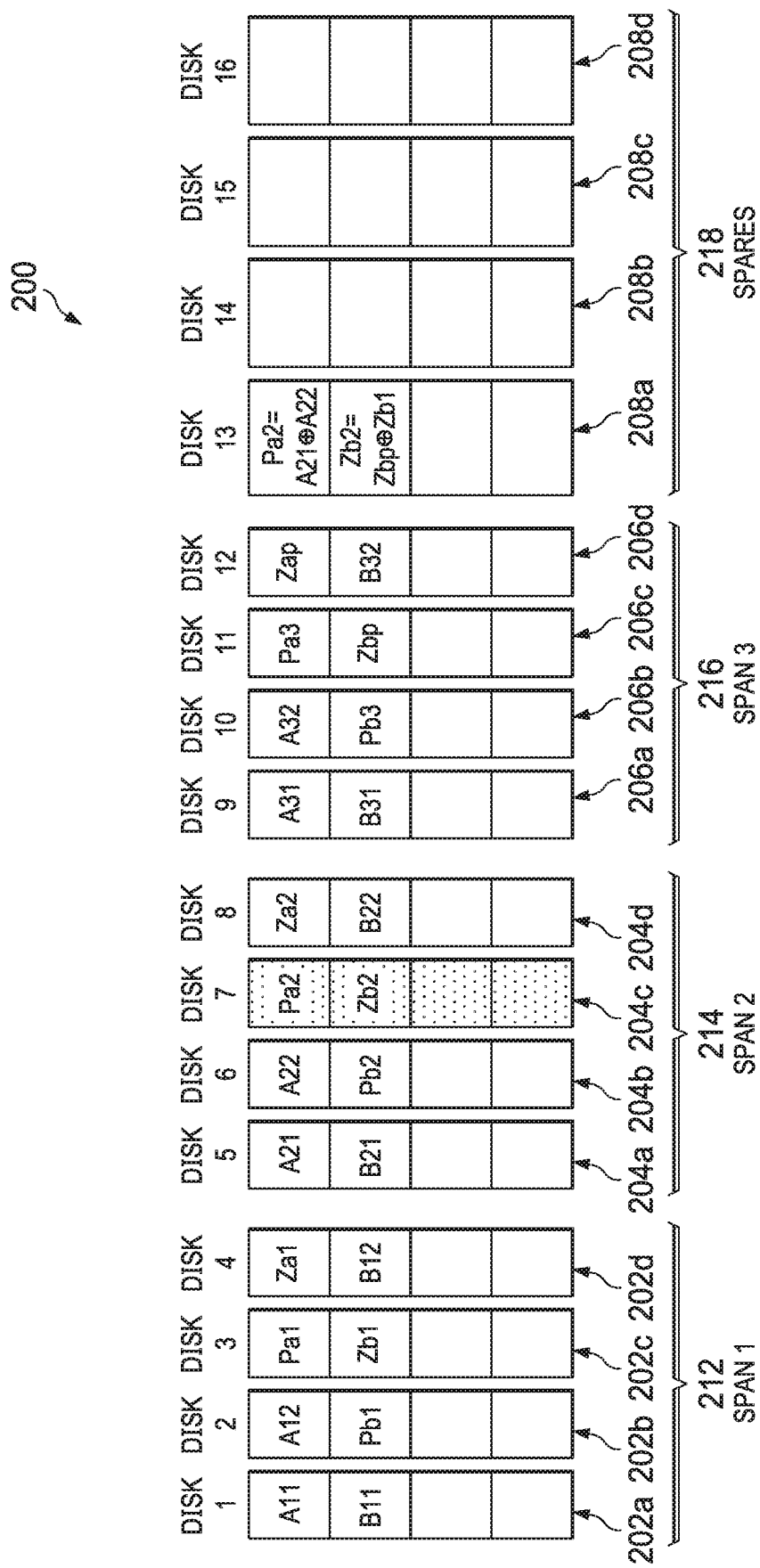
FIGS. 3 through 6 illustrate block diagrams of example data recovery solutions, in accordance with embodiments of this disclosure.

FIG. 3 illustrates how data might be recovered in the embodiment of FIG. 2 if disk 7 (shown in gray) were to fail. As shown, Pa2 and Zb2 will need to be re-generated and written to one of the hot spare disks 208. In this embodiment, Pa2 may be re-generated as Pa2=A21 XOR A22. (The ⊕ sign in this FIGURE and elsewhere in the disclosure denotes the logical XOR operation.) Zb2 may be re-generated as Zb2=Zbp XOR Zb1. As can be seen, both of these operations rely only on data from disks that are still operational.

A similar situation may also occur with regard to a system having an odd number of drives per span. For example, with regard to Table 5 above, disk 7 of span 1 might fail. In this instance, A23 may be re-generated as A21⊕A22⊕Pa2. Pb2 may be re-generated as B21⊕B22⊕B23. The corresponding C data may also be re-generated from undamaged data similarly in accordance with this disclosure.

Figure 4:
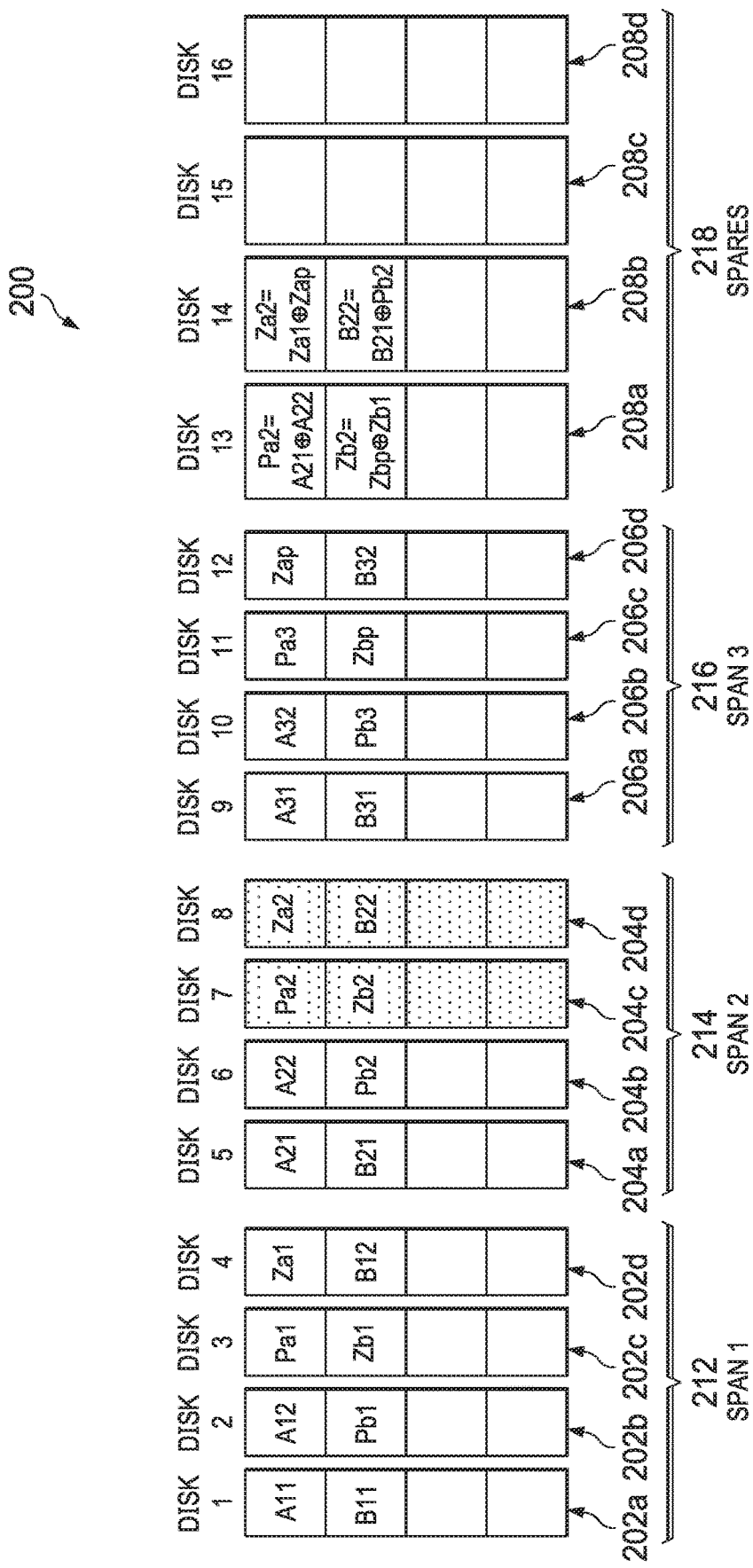

This disclosure may also be used to recover data in situations involving multi-drive failures. FIG. 4 illustrates the embodiment of FIG. 2, in which two drives within span 2 214 have failed. Again, all of the necessary information may be re-generated from undamaged data. In particular, Za2 may be re-generated using Za1 from disk 4 of span 1 212 and Zap from disk 12 of span 3 216, i.e. Za2=Za1 XOR Zap. Similarly, Zb2 may be re-generated using Zb1 from disk 3 of span 1 and Zbp from disk 11 of span 3, i.e. Zb2=Zb1 XOR Zbp. Pa2 may be re-generated using A21 and A22, i.e. Pa2=A21 XOR A22. Finally, B22 may be re-generated using B21 and Pb2, B22=B21 XOR Pb2.

Figure 5:
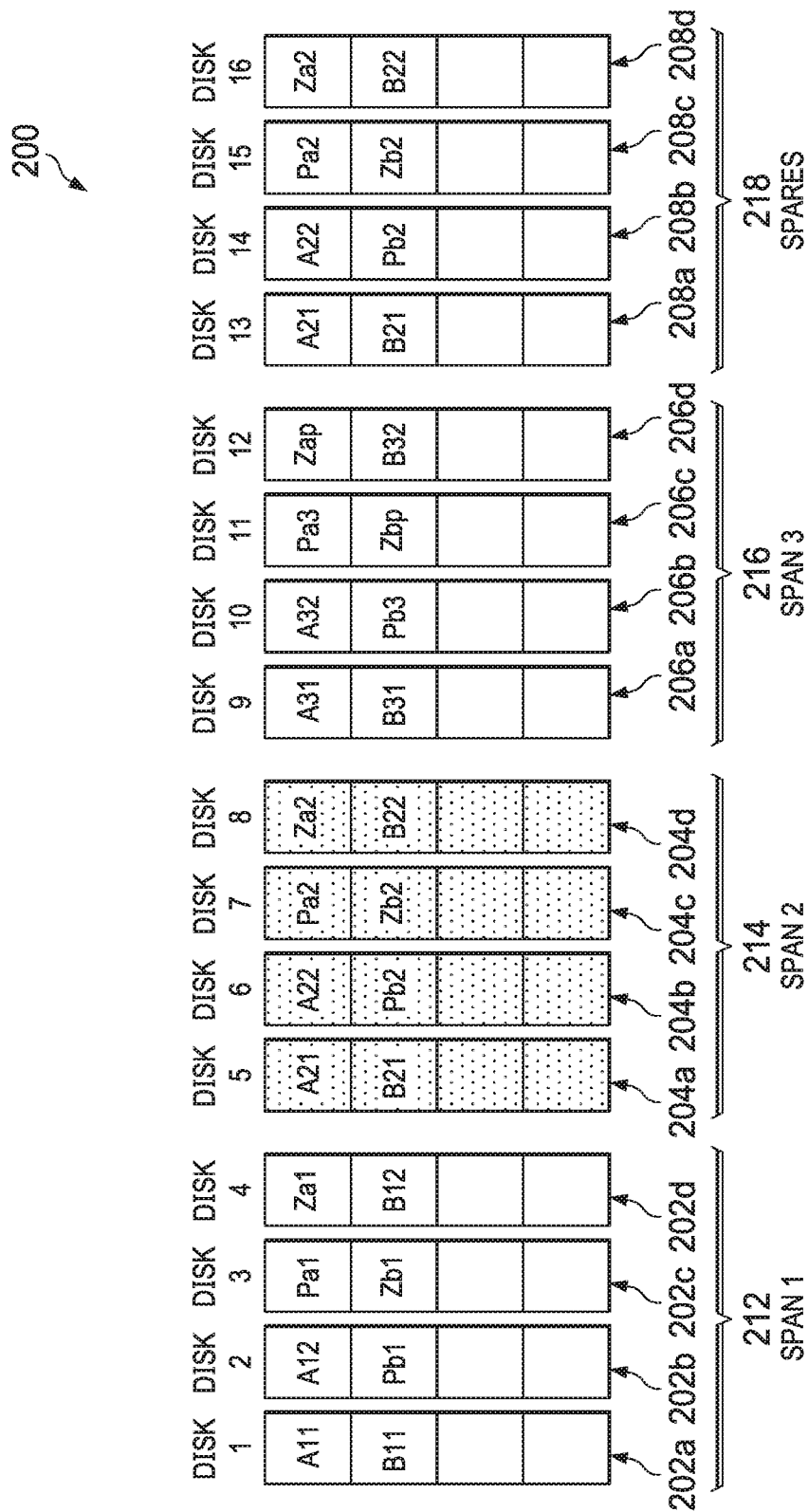

This disclosure may also be used to recover data in situations involving the failure of an entire span. FIG. 5 illustrates the embodiment of FIG. 2, in which span 2 214 has failed altogether. For example, a controller failure or an inadvertent disconnection could cause a failure of this type.

In this embodiment as well, the needed data can again be re-generated from undamaged data.

Za2 may be re-generated using Za1 from disk 4 of span 1 212 and Zap from disk 12 of span 3 216, i.e. Za2=Za1 XOR Zap. Similarly, Zb2 may be re-generated using Zb1 from disk 3 of span 1 212 and Zbp from disk 11 of span 3 216, i.e. Zb2=Zb1 XOR Zbp. Za2 and Zb2 may be written to the respective hot spare drives as shown as they are re-generated.

A2 may then be re-generated using A1, A3 and Za, i.e., A2=A1 XOR A3 XOR Za; A2 may then be striped and written to the hot spare drives along with its P parity (A21, A22 and Pa2).

Similarly, B2 may be re-generated using B1, B3 and Zb, i.e., B2=B1 XOR B3 XOR Zb; B2 may then be striped and written to the hot spare drives along with its P parity (B21, B22 and Pb2).

Figure 6:
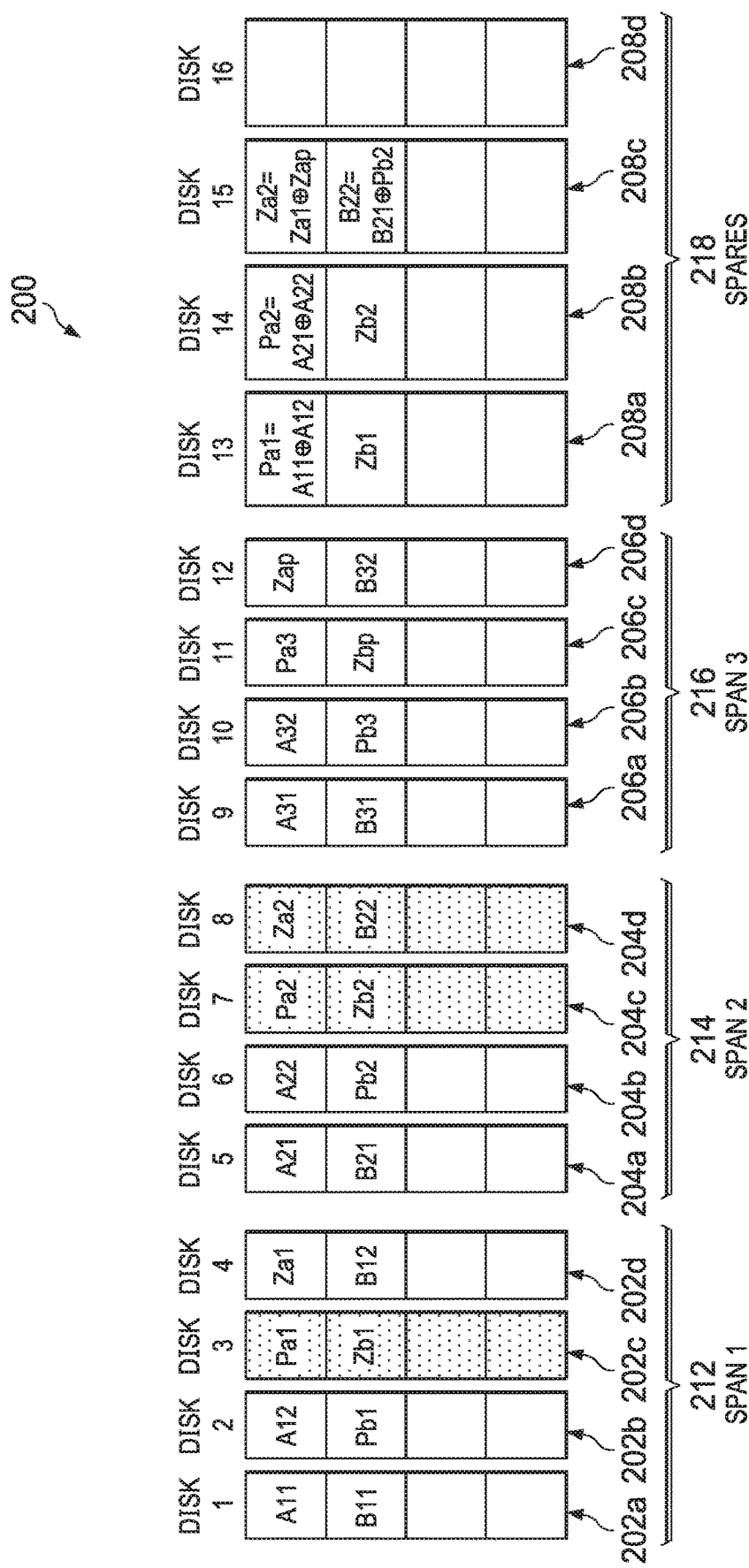

FIG. 6 illustrates yet another embodiment of recovering from drive failures. As shown, in the embodiment of FIG. 2, disk 3 from span 1 212, disk 7 from span 2 214, and disk 8 from span 2 214 may all fail (either simultaneously or simply close in time).

In this embodiment as well, the needed data can again be re-generated from undamaged data.

Pa1 may be re-generated using A11 and A12 from disks 1 and 2 of span 1 212, i.e. Pa1=A11 XOR A12. Pa2 may be re-generated using A21 and A22 from disks 5 and 6 of span 2 214, i.e. Pa2=A21 XOR A22. Za2 may be re-generated using Za1 from disk 4 of span 1 212 and Zap from disk 12 of span 3 216, i.e. Za2=Za1 XOR Zap. B22 may be re-generated using B21 from disk 5 of span 2 214 and Pb2 from disk 6 of span 2 214, i.e., B22=B21 XOR Pb2.

To re-generate Zb1 and Zb2, Zb may be generated first. This may be done by XOR'ing B1, B2 & B3, i.e., Zb=B1 XOR B2 XOR B3. Zb may then be broken down into Zb1 and Zb2, and written on the respective disks as shown.

In some embodiments, if multiple strips of Z parity are missing and cannot be immediately re-generated using the available strips, the corresponding data strips may be first re-generated to get the necessary data block. The Z parity may then be re-generated using the related data block and then striped across the respective disks.

An embodiment similar to that of FIG. 6 may also occur in a system having an odd number of drives per span. For example, with regard to Table 5 above, disk 1 of span 0, disk 11 of span 2, and disk 14 of span 2 might all fail. In this instance, A12 may be re-generated using A11, A13 and Pa1 from remaining good disks of span 0, i.e., A12=A11 XOR A13 XOR Pa1. B12 may be re-generated using B11, B13 & Pb1 from remaining good disks of span 0, i.e., B12=B11 XOR B13 XOR Pb1. A32 may be re-generated using A31, A33 and Pa3 from remaining good disks of span 2, i.e., A32=A31 XOR A33 XOR Pa3. Za3 may be re-generated using Za1, Za2, and Zap, i.e., Za3=Za1 XOR Za2 XOR Zap.

In order to re-generate B32 and B33, B3 may be re-generated first by using B1 XOR B2 XOR B4 XOR Zb. Then, B3 may be broken down into B31, B32 and B33 and striped on respective disks. The corresponding C data may also be re-generated from undamaged data in accordance with this disclosure.

As discussed above, user data may be recovered under various failure scenarios in accordance with this disclosure while one or more drives are in a failed state.

This disclosure also includes various techniques for handling I/O requests while the data storage subsystem has a failure or is in the process of rebuilding to one or more hot spare drives. Some examples of failure scenarios that are contemplated in accordance with this disclosure are:

1. Single drive failure in a span;
2. Multiple drive failure in a span;
3. Complete span failure; and
4. Single and multi-drive failure in two spans.

In general, an I/O request may be handled as described in further detail below. There are various factors to consider while handling an I/O request, for example:

a. The current drive failure state in a span or volume;
b. The state of the rebuild operation if rebuilding; and
c. The relationship of the location of the rebuild operation to the location of the host I/O request.

These can be broken down into various scenarios, as explained below.

Scenario 1: If a drive or multiple drives are missing or have failed, then the host I/O request may be handled as follows.

1. If the host I/O request is a read operation, then the data is generated as explained earlier and serviced by using XOR operations as necessary.

2. If the host I/O request is a write operation, then the data or the corresponding parities (P and Z) may be written to the disks where such disks are present. If disks are missing where data or parities belong, then the write operations may be executed to the disks that are present, and the other information pieces (parity or data) may be discarded.

Scenario 2: Rebuild operation in progress. Data is being rebuilt to hot spare(s), and the host I/O falls in the region already rebuilt.

1. For both the reads and writes, the host I/O request may be handled as in normal operation.

Scenario 3: Rebuild operation in progress. Host I/O overlaps with the region being rebuilt.

1. In this scenario, the host I/O requests (both reads and writes) may be held in the queue, the rebuild operation may be completed, and then the host I/O may be handled as in normal operation.

Scenario 4. Rebuild operation in progress. Host I/O falls in the region yet to be rebuilt. In this scenario, the host I/O is handled like in scenario 1.

1. If the host I/O request is a read operation, then the data is generated as explained earlier and serviced by using XOR operations as necessary.

2. If the host I/O request is a write operation, then the data or the corresponding parities (P and Z) may be written to the disks where such disks are present. If disks are missing where data or parities belong, then the write operations may be executed to the disks that are present, and the other information pieces (parity or data) may be discarded.

In some embodiments, the re-generated data may be written on hot spare disks, and the corresponding LBA addresses may be tracked to reduce the rebuild time.

The foregoing discussion of I/O handling scenarios is presented at a relatively high level for the sake of brevity, and the low-level details will be apparent to one of ordinary skill in the art with the benefit of this disclosure.

According to embodiments of the present disclosure, span level failures may be addressed in addition to other failure modes. The present disclosure thus may provide better availability than existing solutions. Further, by doing away with the computationally expensive calculation of Q parity, which is typically calculated using the mathematics of Galois fields, additional benefits may be realized.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor(s) to furthering the art, and are construed as being without limitation to such specifically recited examples and conditions. The fact that some particular element may be described as "background" or the like should not be taken as an admission regarding its prior-art status. Although embodiments of the present disclosure have been described in detail, it should be understood that various changes, substitutions, and alterations could be made hereto without departing from the spirit and scope of the disclosure.

What is claimed is:

1. A method comprising:
   in response to receiving data A to be stored in a storage system that includes a plurality of N spans each including a plurality of M drives, performing data storing operations comprising:
      storing the data A in N portions across the plurality of spans;
      generating a Za parity based on an XOR operation applied to the N portions of the data A;
      storing the Za parity in N−1 portions across a subset of the plurality of spans;
      determining a Zap parity that is equal to a result of an XOR operation applied to the N−1 portions of the Za parity; and
      storing the Zap parity.

2. The method of claim 1, wherein the Zap parity is stored on a span that is not within the subset.

3. The method of claim 1, wherein N is greater than or equal to M+1.

4. The method of claim 1, wherein a portion of the data A that is stored in a particular span is divided into M−2 portions.

5. The method of claim 4, further comprising calculating a P parity for the particular span based on an XOR operation applied to the M−2 portions of the data A.

6. The method of claim 1, wherein the storage system further includes at least one hot spare drive.

7. The method of claim 6, further comprising: in response to a failure of a particular drive, re-generating data from the particular drive for storage on the at least one hot spare drive.

8. The method of claim 6, wherein the at least one hot spare drive comprises a plurality of hot spare drives, and wherein the method further comprises: in response to a failure of a particular span, re-generating data from the particular span for storage on the plurality of hot spare drives.

9. An article of manufacture comprising a non-transitory, computer-readable medium having instructions stored thereon that are configured to be executed by a computer system having a storage system that includes a plurality of N spans each including a plurality of M drives, the instructions for:
   in response to receiving data A to be stored in the storage system, performing data storing operations comprising:
      storing the data A in N portions across the plurality of spans;
      generating a Za parity based on an XOR operation applied to the N portions of the data A;
      storing the Za parity in N−1 portions across a subset of the plurality of spans;
      determining a Zap parity that is equal to a result of an XOR operation applied to the N−1 portions of the Za parity; and
      storing the Zap parity.

10. The article of claim 9, wherein the operations further comprise storing the Zap parity on a span that is not within the subset.

11. The article of claim 9, wherein N is greater than or equal to M+1.

12. The article of claim 9, wherein a portion of the data A that is stored in a particular span is divided into M−2 portions.

13. The article of claim 12, the operations further comprising calculating a P parity for the particular span based on an XOR operation applied to the M−2 portions of the data A.

14. The article of claim 9, wherein the storage system further includes at least one hot spare drive.

15. A system comprising:
    at least one processor; and
    a storage system that includes a plurality of N spans each including a plurality of M drives;
    wherein, in response to receiving data A to be stored in the storage system, the system is configured to perform data storing operations comprising:
       storing the data A in N portions across the plurality of spans;
       generating a Za parity based on an XOR operation applied to the N portions of the data A;
       storing the Za parity in N−1 portions across a subset of the plurality of spans;
       determining a Zap parity that is equal to a result of an XOR operation applied to the N−1 portions of the Za parity; and
       storing the Zap parity.

16. The system of claim 15, wherein the system is further configured to store the Zap parity on a span that is not within the subset.

17. The system of claim 15, wherein N is greater than or equal to M+1.

18. The system of claim 15, wherein a portion of the data A that is stored in a particular span is divided into M−2 portions.

19. The system of claim 18, wherein the system is further configured to calculate a P parity for the particular span based on an XOR operation applied to the M−2 portions of the data A.

20. The system of claim 15, wherein the storage system further includes at least one hot spare drive.

* * * * *